Patented Apr. 6, 1948

2,439,159

UNITED STATES PATENT OFFICE 2,439,159

FLUXING METHOD IN SOLDERING

Joy F. Dillinger, Riverside, and Charles C. Patton, Chicago, Ill., assignors to Western Electric Company, Incorporated, New York, N. Y., a corporation of New York No Drawing. Application April 9, 1943, Serial No. 482,488

3 Claims. (Cl. 148—26)

This invention relates to a fluxing method and more particularly to a method of entraining flux in soldering flames.

In the past, fluxes have been provided for application directly to the parts to be soldered prior to directing a soldering flame to the parts. One method which has been proven satisfactory is covered by the patent to R. S. Dean and R. V. Wilson No. 1,838,370, patented December 29, 1931, wherein a fluxing material which will be active only when subjected to soldering temperatures is applied to the parts and a soldering flame is then directed against the parts to cause the evolution of free halogens. Other processes have been proposed including those which propose the step of including in the soldering flame those materials which, when heated to soldering temperature, break down and give up hydrochloric acid gas, which will flux the parts.

Dean and Wilson, in their article in "Industrial and Engineering Chemistry," volume 19, No. 12 (Dec. 1927), pages 1312 to 1314, point out that dry hydrochloric acid gas serves as an excellent flux. However, the maintenance of dry hydrochloric acid gas in the area to be soldered involves a number of practical difficulties, such, for example, as maintaining the articles to be soldered together in a closed chamber containing hydrochloric acid gas. In most of the attempts to utilize the fluxing effect of hydrochloric acid gas, halogen compounds are utilized which, when burned in the soldering flame, give off the gas.

It is an object of the present invention to provide a simple method of uniformly distributing a flux to a point to be soldered.

In the present invention, the necessity for performing the soldering operations in a closed chamber or smearing the parts with a compound which will evolve hydrochloric acid gas at the soldering temperature is unnecessary since, in the present invention, the hydrochloric acid gas is entrained in the flame by the simple expedient of bubbling either the combustible gas or air stream directed to the soldering torch through a solution of hydrochloric acid gas, preferably an aqueous solution. Since hydrochloric acid gas is readily soluble and will readily entrain in either the air or the combustible gas, a simplified method of fluxing is provided. In practicing the present invention, preferably 35% to 37% of HCl, mixed with 65% to 63% of water and either the air or the combustible gas, is passed directly through a bubble bottle containing this solution, no attempt being made to remove the water or otherwise dry the hydrochloric acid gas before introducing it into the soldering flame. Apparently the water and gas are both entrained in either the combustible gas or air directed to the flame and while this may possibly result in some slight cooling of the flame, the cooling effect is so small that it will not appreciably affect the melting action of the flame on the solder. Furthermore, a very uniform flow may be provided and the hydrochloric acid gas in the flame will be maintained whereby oxides and other undesirable impurities which would prevent proper union of the parts to be soldered are removed.

What is claimed is:

1. A method of supplying flux to a heating flame which comprises passing one of the gases of combustion for the flame through an aqueous solution of hydrochloric acid gas wherein the solution contains from 35% to 37% HCl and the remainder water.

2. A method of supplying flux to a heating flame which comprises passing one of the gases of combustion for the flame through an aqueous solution of hydrochloric acid gas to entrain the hydrochloric acid gas and a small amount of water in the combustion gases to produce a fluxing agent comprising the hydrochloric acid gas and water vapor at the flame.

3. A fluxing method which comprises making a solution of hydrochloric acid gas in water and bubbling one of the combustion gases through the solution of hydrochloric acid gas and water to provide a moist flux at the point of combustion by the entrainment of hydrochloric acid gas and a small amount of water vapor in the gases of combustion.

JOY F. DILLINGER.
CHARLES C. PATTON.

REFERENCES CITED

The following references are of record in the file of this patent:

UNITED STATES PATENTS

| Number | Name | Date |
|---|---|---|
| 1,838,370 | Dean et al. | Dec. 29, 1931 |
| 2,211,448 | Vaughn et al. | Aug. 13, 1940 |
| 2,277,064 | Bialosky et al. | Mar. 24, 1942 |

OTHER REFERENCES

Dean and Wilson, Industrial and Engineering Chemistry, vol. 19, No. 12 (Dec. 1927), pp. 1312 to 1314.